E. I. JOHNSON.
AUTOMOBILE HEATER.
APPLICATION FILED MAY 17, 1919.
1,357,093.
Patented Oct. 26, 1920.
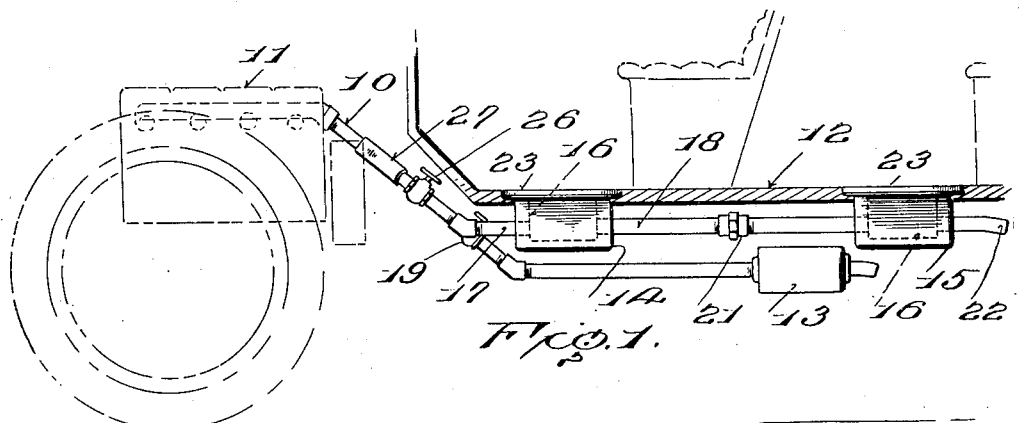
FIG. 1.
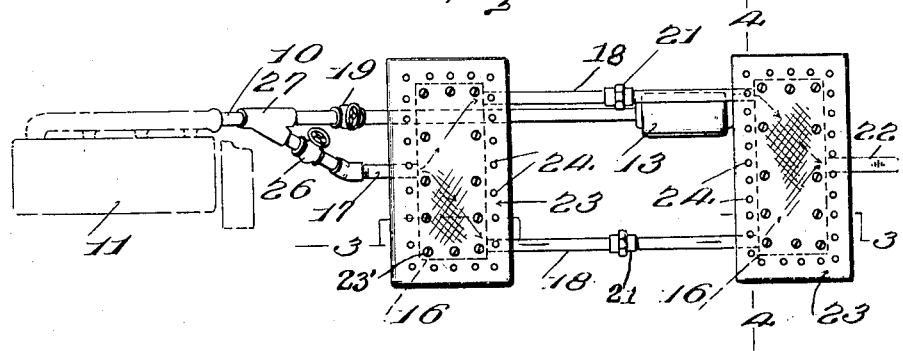
FIG. 2.
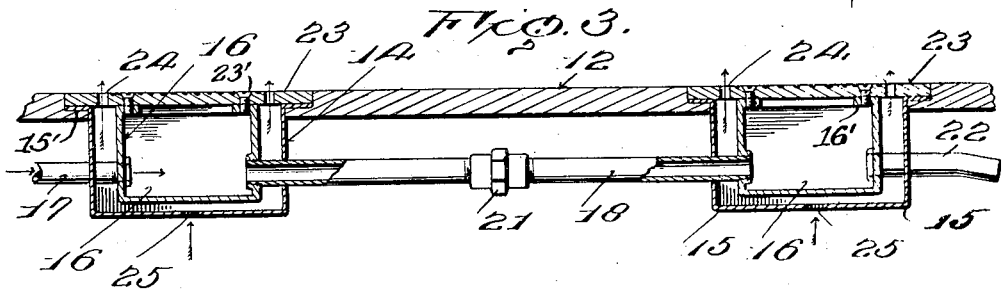
FIG. 3.
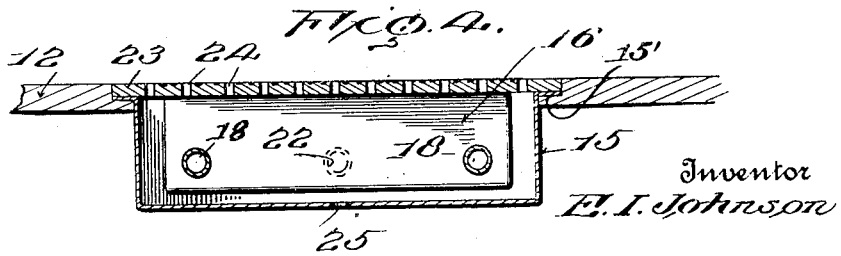
FIG. 4.
Inventor
E. I. Johnson
Attorneys

UNITED STATES PATENT OFFICE.

EDWARD I. JOHNSON, OF CLEMENT, NORTH DAKOTA.

AUTOMOBILE-HEATER.

1,357,093.

Specification of Letters Patent.  Patented Oct. 26, 1920.

Application filed May 17, 1919. Serial No. 297,730.

*To all whom it may concern:*

Be it known that I, EDWARD I. JOHNSON, a citizen of the United States, residing at Clement, in the county of Dickey and State of North Dakota, have invented certain new and useful Improvements in Automobile-Heaters; and I do hereby declare the following to be a full, clear, and exact description of the invention, such as will enable others skilled in the art to which it appertains to make and use the same.

This invention relates to new and useful improvements in heating apparatus, and particularly to heating apparatus for automobiles.

One object of the present invention is to provide a novel and improved apparatus in which the exhaust gases from the engine are utilized to heat the interior of the automobile.

Another object resides in the novel and improved structure of the heat radiating device which is disposed in the floor of the automobile.

Other objects and advantages will be apparent from the following description when taken in connection with the accompanying drawing.

In the drawing:

Figure 1 is a side elevation of the heating apparatus, portions of the automobile being shown in dotted lines.

Fig. 2 is a top plan view of the apparatus showing the general arrangement of the parts, and the connections to the automobile engine.

Fig. 3 is a vertical longitudinal central sectional view taken on the line 3—3 of Fig. 2, showing the interior construction of the radiators, and the pipe connections thereto.

Fig. 4 is a vertical transverse sectional view taken on the line 4—4 of Fig. 2, through one of the radiators.

Referring particularly to the accompanying drawing, 10 represents the exhaust pipe which leads from the engine 11 of the automobile. This pipe extends rearwardly beneath the automobile floor 12 and is connected to the muffler 13 at the rear of the automobile.

The automobile shown is a two-seated one, and disposed in an opening through the floor of the automobile in front of the front seat is a depending casing 14, while in front of the rear seat is disposed the depending casing 15. Each has an open top with a surrounding outturned flange 15' by which the casing is supported from and below the floor. Within the casing is located a metal box 16 spaced from the sides and ends and bottom thereof, and each box also has an open top with a surrounding inturned flange 16'. A Y-coupling 27 is let into the exhaust pipe 10, one branch being connected through a valve 19 with the muffler, and the other branch through a valve 26 with a pipe 17 which passes through the front wall of the front casing 14 and opens through the front wall of the box therein, the opening being about at the midlength of the box as seen in Fig. 2. Leading from the rear wall of this box near its ends and through the rear wall of the casing 14 are two pipes 20 which extend straight back and into the rear box 16, each of these pipes being preferably made in sections connected by a union 21. Opening through the rear wall of the rear box 16 and leading through the corresponding wall of its casing 15 at about the midlength of these parts as seen in Fig. 2, is an outlet pipe 22.

The numeral 23 designates a cover plate which is of a size to overlie a casing and rest at its edges on the flange thereof, at which time the face of the plate will be substantially flush with the face of the floor 12, and screws 23' pass downward through this plate and into the inturned flange 16' of the box so as to support the latter properly within its casing. The plate therefore becomes the top of the box which it closes tightly, and where it extends across the space between the walls of the box and casing it is provided with perforations 24. The bottom of the casing is provided with an inlet opening 25.

Now when the valve 19 is closed and the valve 26 opened, the gases from the engine flow into the front box 16, thence through the two pipes 18, into the rear box, and then out the outlet pipe 22. Thereby the heat of the gases within the boxes warms those portions of the plates with which the gases directly contact, and the walls and bottom of each box are warmed so that they heat the fresh air drawn into the casing at 25 and pass it upwardly in heated condition through the perforations 24 which communicate only with the air space or jacket.

The result is that no smoke, odors, or sparks can pass into the car and the only air admitted through the floor is heated while the valve 26 is open. In summer this valve will be closed and the valve 19 opened, and in temperate weather the valves may both be opened a little.

Without further illustration it will be understood that if the automobile have but a single seat, the rear casing and box can be omitted and one or both the pipes 18 will serve as the outlet. The obvious purpose of having these pipes out of line with the inlet pipe 17, is to cause the gases in the box to flow from a central point where they are admitted in both directions toward its ends where they escape, and thereby spread their heat over all parts of the box.

The apparatus is readily capable of being connected to any automobile now in use, it being only necessary to provide the proper type of coupling 27 to connect the pipe 17 with the exhaust pipe 10, and to properly set the valves 19 and 26.

Not only does pure air issue in a heated condition from the openings 24, but the plate 23 becomes heated direct from the gases so that the feet can be kept warm by placing them on the plate.

There is thus provided a novel and simple heating apparatus for an automobile and one which can be readily and easily applied to automobiles now in use.

What is claimed is:

A heating apparatus for an automobile comprising a metallic casing having an air inlet and an open top with a surrounding outstanding flange by which the casing is adapted to be supported through an opening in the automobile floor, a box within and spaced from the bottom and the walls of said casing and having an open top with an inturned flange, a cover plate overlying the flanges of both said casing and box and perforated above the space between their walls, fastening means between the plate and the box-flange, a gas inlet pipe leading from the exhaust manifold through one wall of the casing and opening through the corresponding wall of the box into the latter, means for controlling the flow of gas through this pipe, and outlet pipes leading through the opposite wall of the casing and opening through the corresponding wall of the box out of line with the inlet pipe.

In testimony whereof, I affix my signature in the presence of two witnesses.

EDWARD I. JOHNSON.

Witnesses:
GLENN V. DILL,
LOUISE DANIELSON.